(12) United States Patent
Sarma et al.

(10) Patent No.: US 12,477,499 B2
(45) Date of Patent: Nov. 18, 2025

(54) SYSTEMS AND METHODS FOR ANALYTICS AND INFORMATION SHARING BETWEEN A RADIO ACCESS NETWORK AND A CORE NETWORK

(71) Applicant: Verizon Patent and Licensing Inc., Basking Ridge, NJ (US)

(72) Inventors: Sandeep Sarma, Chennai (IN); Kristen Sydney Young, Mine Hill, NJ (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 546 days.

(21) Appl. No.: 18/046,688

(22) Filed: Oct. 14, 2022

(65) Prior Publication Data
US 2024/0129876 A1 Apr. 18, 2024

(51) Int. Cl.
| | |
|---|---|
| *H04W 60/04* | (2009.01) |
| *H04L 65/1016* | (2022.01) |
| *H04L 65/80* | (2022.01) |
| *H04W 60/06* | (2009.01) |

(52) U.S. Cl.
CPC ......... *H04W 60/04* (2013.01); *H04L 65/1016* (2013.01); *H04W 60/06* (2013.01); *H04L 65/80* (2013.01)

(58) Field of Classification Search
CPC .. H04W 60/04; H04W 60/06; H04L 65/1016; H04L 65/80; H04L 65/1096
See application file for complete search history.

(56) References Cited

U.S. PATENT DOCUMENTS

| | | | |
|---|---|---|---|
| 2021/0092793 A1* | 3/2021 | Centonza | H04W 64/00 |
| 2024/0121630 A1* | 4/2024 | Boccuzzi | H04L 41/12 |
| 2024/0137392 A1* | 4/2024 | Keller | H04L 65/1063 |

(Continued)

OTHER PUBLICATIONS

Third Generation Partnership Project, "Technical Specification Group Services and System Aspects; System Architecture for the 5G System (5GS); Stage 2 (Release 17)," TS 23.501 V17.6.0 (Sep. 2022).

(Continued)

*Primary Examiner* — Oussama Roudani

(57) ABSTRACT

A system described herein may register a particular Service-Based Interface ("SBI") with a core network (e.g., a Fifth Generation core ("5GC")). The core network may maintain information associating the system with the particular SBI. The system may request core network information, associated with the core network, from the core network. The core network may provide the requested core network information to the device via the registered particular SBI. The system may provide the core network information, received via the particular SBI, to a radio access network ("RAN"), such as an Open-RAN ("O-RAN"), which may modify RAN configuration parameters based on the provided core network information. The system may also receive requests for RAN information from the core network via the SBI, may obtain the information from one or more elements of the RAN, and may provide the requested RAN information to the core network via the SBI.

21 Claims, 15 Drawing Sheets

(56) References Cited

U.S. PATENT DOCUMENTS

2024/0214272 A1* 6/2024 Ying .................. H04L 41/0894
2024/0250879 A1* 7/2024 Forenza ................. H04L 41/40

OTHER PUBLICATIONS

Third Generation Partnership Project, "Technical Specification Group Services and System Aspects; Architecture Enhancements for 5G System (5GS) to Support Network Data Analytics Services (Release 17)," TS 23.288 V17.6.0 (Sep. 2022).

Third Generation Partnership Project, "Technical Specification Group Core Network and Terminals; 5G System; Network Data Analytics Services; Stage 3 (Release 17)," 3GPP TS 29.520 V17.8.0 (Sep. 2022).

O-RAN Alliance, "O-RAN Working Group 2 Non-RT RIC Architecture," O-RAN.WG2.Non-RT-RIC-ARCH-TS-v02.00 (Mar. 2022).

O-RAN Alliance, "O-RAN Working Group 2(Non-RT RIC and A1 interface WG), R1 Use Cases and Requirements," O-RAN.WG2.R1 Use Cases and Requirements-v01.00 (Jan. 2022).

O-RAN Alliance, "O-RAN Working Group 2 (Non-RT RIC and A1 interface WG), R1 interface: General Aspects and Principles," O-RAN.WG2.R1GAP-v02.00 (Mar. 2022).

* cited by examiner

SYSTEMS AND METHODS FOR ANALYTICS AND INFORMATION SHARING BETWEEN A RADIO ACCESS NETWORK AND A CORE NETWORK

BACKGROUND

Wireless networks may include radio access networks ("RANs"), such as Long-Term Evolution ("LTE") networks, Fifth Generation ("5G") networks, or other types of RANs. RANs may provide wireless connectivity to User Equipment ("UEs"), such as mobile telephones, Internet of Things ("IoT") devices, automated guided vehicles ("AGVs"), or the like. RANs may be communicatively coupled to core networks, such as an Evolved Packet Core ("EPC"), a 5G Core ("5GC"), that provide routing services or other types of services. End-to-end Quality of Service ("QoS") metrics associated with UEs that connect to a core network via a RAN may be impacted by the performance of both the core network and the RAN.

DETAILED DESCRIPTION OF EXAMPLE EMBODIMENTS

Figure 1A:
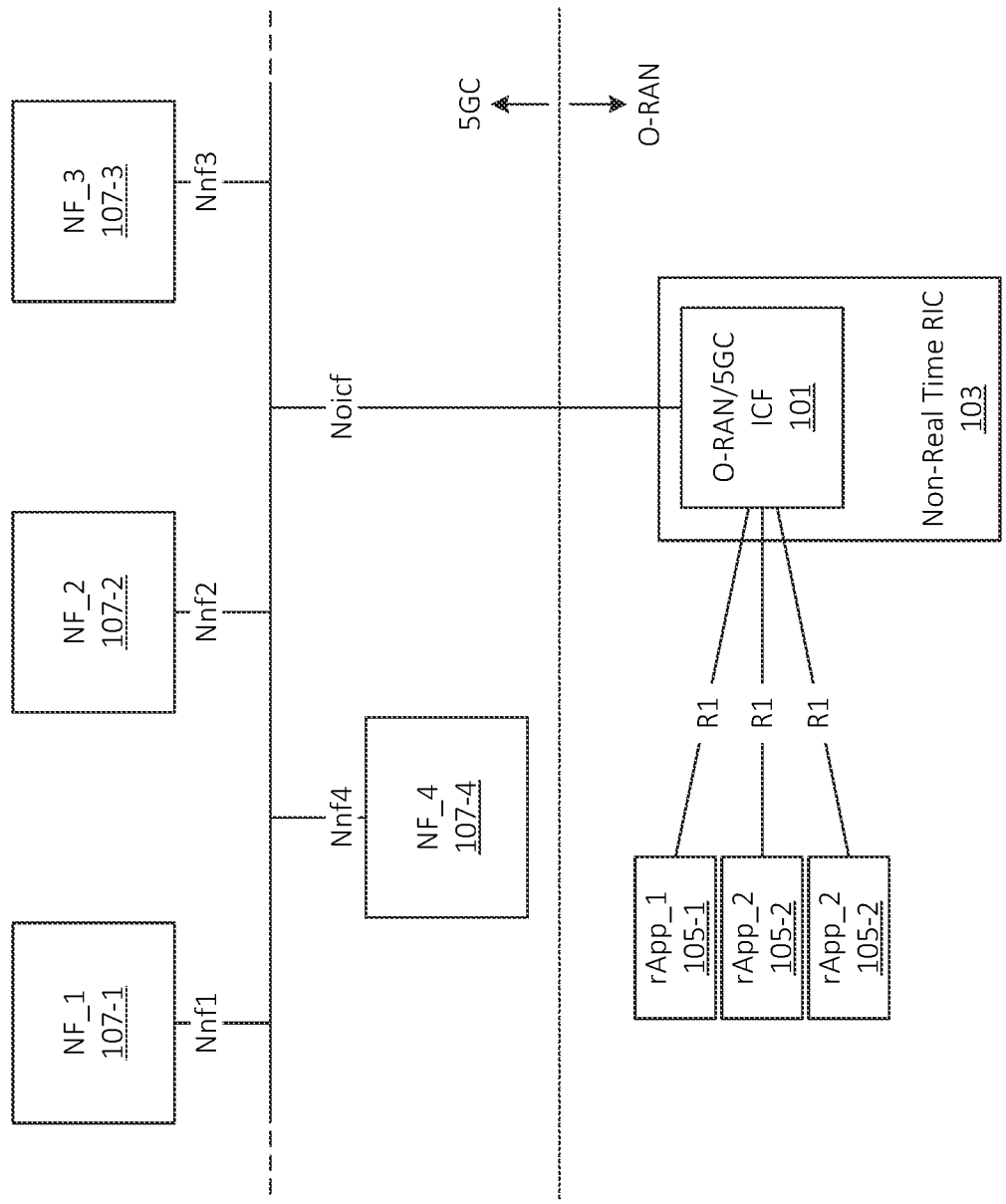
FIGS. 1A and 1B illustrate an example overview of one or more embodiments described herein.

The following detailed description refers to the accompanying drawings. The same reference numbers in different drawings may identify the same or similar elements.

End-to-end QoS metrics associated with UEs that connect to a core network via a RAN may be impacted by the performance of both the core network and the RAN. In some situations, a core network and a RAN may both be operated by separate entities, and/or may otherwise not typically communicate with each other. Thus, in situations where RAN performance is degraded, end-to-end performance may be degraded even if core network performance is within acceptable thresholds. On the other hand, in situations where core network performance is degraded, end-to-end performance may be degraded even if RAN performance is within acceptable thresholds.

Embodiments described herein provide for the intercommunication between a RAN and a core network, such that a core network is able to receive information (e.g., analytics information, congestion information, event information, etc.) associated with a RAN to which the core network is connected. Some embodiments described herein provide for the intercommunication between the RAN and the core network, such that the RAN is able to receive information associated with the core network to which the RAN is connected. Accordingly, a RAN may be able to adjust RAN parameters in order to account for potential performance issues with a core network. Similarly, in accordance with some embodiments, the core network may be able to adjust core network parameters in order to account for potential performance issues with the RAN. As such, by becoming "aware" of metrics associated with the other, the RAN or the core network may be able to adjust parameters in order to preserve end-to-end QoS metrics when the other is experiencing performance degradations or other potential issues.

In some embodiments, a RAN may include and/or may be implemented as an O-RAN (e.g., based on one or more O-RAN Alliance standards), which defines various functions and interfaces between such functions in order to implement the RAN. Embodiments described herein may provide for the intercommunication between an O-RAN and one or more core networks. In some embodiments, a core network may include or may be implemented by a 5GC (e.g., based on one or more Third Generation Partnership ("3GPP") 5G standards), which may define various network functions ("NFs") and interfaces between such NFs in order to implement the 5GC. In some embodiments, such interfaces may include or may be implemented by service-based interfaces ("SBIs"), in which the 5GC (e.g., a Network Repository Function ("NRF") of the 5GC) may maintain information associating particular NFs with particular SBIs. Such information may be used to appropriately route communications, associated with a given SBI, to an appropriate NF (or NF instance). Embodiments described herein may provide for the intercommunication between a 5GC (or other type of core network that utilizes SBIs or other types of suitable routing mechanisms) and an O-RAN or other type of RAN.

As shown in FIG. 1A, some embodiments may include an O-RAN/5GC Intercommunication Function ("OICF") 101, which may facilitate communications between elements of an O-RAN with elements of a 5GC. In some embodiments, OICF 101 may be implemented by, integrated with, communicatively coupled to (e.g., via an application programming interface ("API") or other suitable communication pathway), and/or otherwise associated with one or more elements of the O-RAN. For example, in some embodiments, OICF 101 may be implemented by, integrated in, communicatively coupled to, etc. Non-Real Time Radio Intelligent Controller ("RIC") 103, which may be part of a Service Management and Orchestration ("SMO") framework of the O-RAN. Generally, Non-Real Time RIC 103 and/or other elements of the SMO framework may configure parameters of the O-RAN, such as antenna beamforming parameters, Quality of Service ("QoS") parameters, access and mobility parameters, load balancing parameters, and/or other operational parameters of the O-RAN.

In some embodiments, Non-Real Time RIC 103, and/or elements or functions included in or implemented by Non-Real Time RIC 103, may communicate with one or more RAN automation applications ("rApps") 105 (e.g., rApps 105-1, 105-2, and 105-3) via an R1 interface, and may configure parameters of the O-RAN based on communications received from such rApps 105. In some embodiments, operations described herein as being performed by Non-Real Time RIC 103 may be performed by a Data Management and Exposure function ("DME"), which may be implemented by, communicatively coupled to, and/or otherwise associated with Non-Real Time RIC 103.

In some embodiments, rApps 105 may receive information from Non-Real Time RIC 103 via the R1 interface, such as RAN analytics or other metrics (e.g., cell load information, quantity of connected UEs, call drop rates, latency information, etc.), RAN event information (e.g., connection or disconnection of UEs, session establishment event information, etc.), and/or other suitable information. Such rApps 105 may perform processing, aggregating, and/or other operations based on the received information in order to provide instructions, aggregated analytics information, configuration parameters, or other information based on which Non-Real Time RIC 103 may determine parameters of the O-RAN.

In accordance with some embodiments, OICF 101 may implement the R1 interface, in order to communicate with rApps 105. OICF 101 may for example, receive requests from rApps 105, Non-Real Time RIC 103, and/or other suitable elements for analytics information, event information, and/or other types of information associated with a core network, such as a 5GC. As discussed above, such information may be used (e.g., by rApps 105, Non-Real Time RIC 103, etc.) to determine RAN parameters of the O-RAN, such as to preserve end-to-end QoS parameters in situations where the 5GC is exhibiting factors that may impact the delivery of such QoS parameters.

As also discussed below, in some embodiments, OICF 101 may receive requests for RAN information (e.g., RAN analytics information, RAN event information, RAN configuration information, etc.) from one or more NFs 107 of the 5GC (e.g., via an SBI, as discussed below), and may forward such requests to one or more rApps 105 or other elements of the O-RAN. OICF 101 may obtain, receive, etc. the requested information from one or more such rApps 105 or other suitable elements of the O-RAN (e.g., which may provide such information via an AI interface, an E2 interface, or other suitable interface), and may provide (e.g., via the SBI) the requested information to the one or more requesting NFs 107.

Although generally referred to as "NFs," NFs 107 may be, may include, may be communicatively coupled to, etc. particular NFs or other elements of the 5GC. Such NFs or other elements may include a Data Collection Coordination Function ("DCCF"), a Network Data Analytics Function ("NWDAF"), an Access and Mobility Management Function ("AMF"), a Session Management Function ("SMF"), a User Plane Function ("UPF"), a Unified Data Management function ("UDM"), a Policy Control Function ("PCF"), and/or other suitable element of the 5GC or of another suitable core network.

Figure 1B:
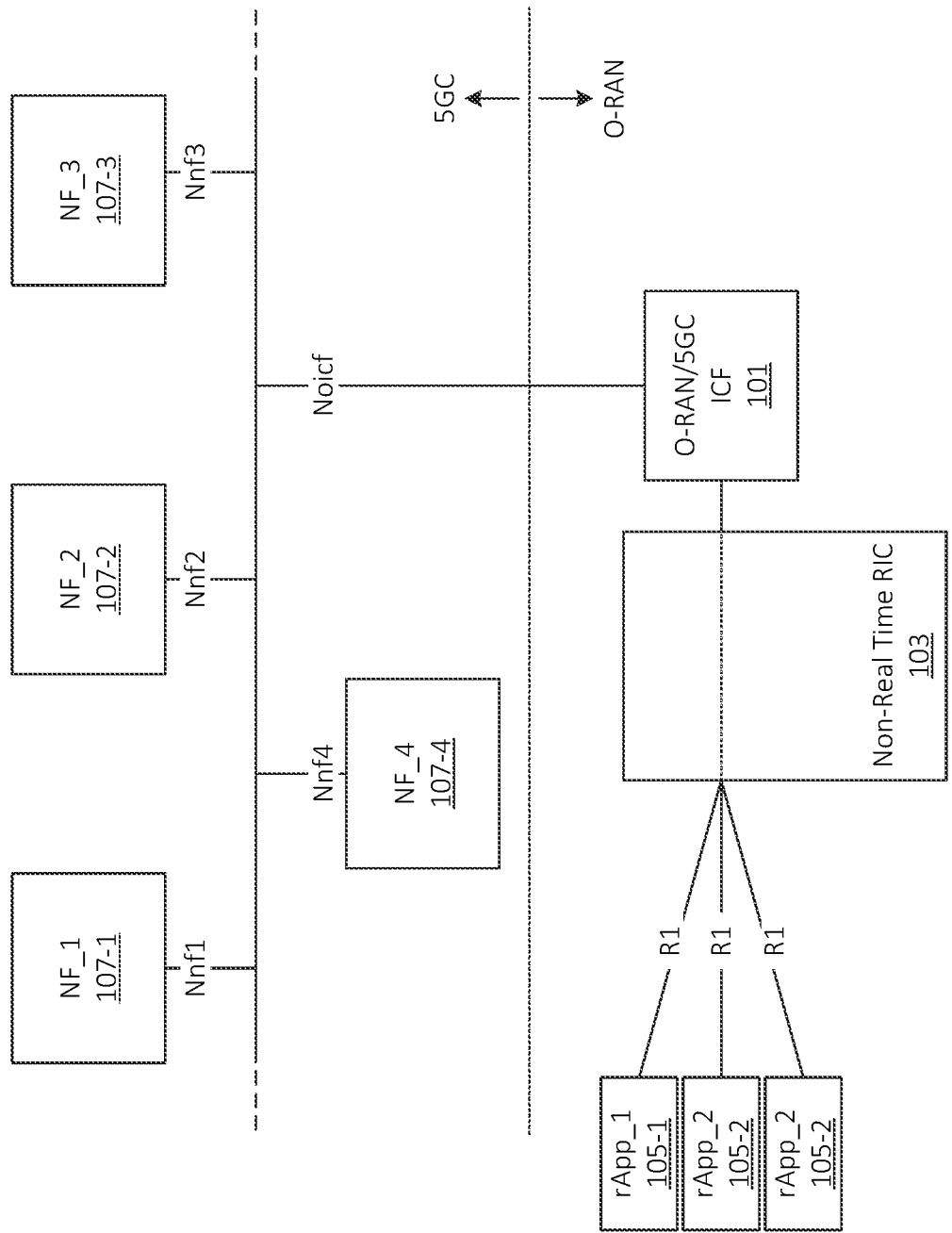

In some embodiments, as shown in FIG. 1B, OICF 101 may be communicatively coupled to Non-Real Time RIC 103 (e.g., via an API or other suitable communication pathway), and may communicate (e.g., indirectly) with rApps 105 via Non-Real Time RIC 103. For example, rApps 105 may output communications, such as core network information requests, to Non-Real Time RIC 103 via the R1 interface. Non-Real Time RIC 103 may, in some embodiments, identify that the communications should be directed to OICF 101 based on determining that the requests include requests for information directed to a core network (e.g., the 5GC) to which OICF 101 is communicatively coupled.

In some embodiments, OICF 101 may receive (e.g., via an SBI) requests for RAN information (e.g., RAN analytics information, RAN event information, RAN configuration information, etc.) from one or more NFs 107 of the 5GC, and may forward such requests to Non-Real Time RIC 103, which may identify one or more rApps 105 or other elements of the O-RAN to which such information requests should be forwarded. OICF 101 may receive the requested information from Non-Real Time RIC 103 (e.g., which may have received the requested information from the one or more rApps 105 and/or other elements of the O-RAN), and may provide (e.g., via the SBI) the requested information to the one or more requesting NFs 107.

As noted above, in order to obtain or otherwise receive the requested core network information, OICF 101 may implement an SBI via which OICF 101 may communicate with NFs 107. For example, each respective NF 107 (e.g., NFs 107-1 through 107-4, in the examples of FIGS. 1A and 1B) may be associated with a respective SBI (e.g., NF 107-1 may be associated with a first SBI referred to as "Nnf1," NF 107-2 may be associated with a second SBI referred to as "Nnf2," and so on). As such, communications within the 5GC directed to the "Nnf1" SBI may be routed to NF 107-1, communications within the 5GC directed to the "Nnf2" SBI may be routed to NF 107-2, and so on. In accordance with some embodiments, the SBI associated with OICF 101 may be referred to as "Noicf." As such, communications within the 5GC directed to the "Noicf" SBI may be routed to OICF 101.

For example, OICF 101 may request core network information from particular NFs 107 (e.g., by specifying particular SBIs for the core network information requests), and/or may request core network information types which may be appropriately routed by a routing element or other suitable element of the 5GC to a respective NF 107. Such requests may, as discussed above, be based on core network information requests received from rApps 105, Non-Real Time RIC 103, or other suitable requestors. In some embodiments, the particular NFs 107 that provide the core network information may be, may include, may be communicatively coupled to, for example, a DCCF, an NWDAF, an AMF, or other suitable type of NF 107. OICF 101 may receive, from such NFs 107, the requested information via the Noicf interface and, as discussed above, may provide the requested core network information to one or more suitable rApps 105, Non-Real Time RIC 103, or other suitable requestors of the information.

Additionally, in accordance with some embodiments, OICF 101 may receive RAN information requests (e.g., via the Noicf SBI) from one or more NFs 107, and may forward such requests to Non-Real Time RIC 103, rApps 105, and/or other suitable elements of the O-RAN. In some embodiments, Non-Real Time RIC 103 may receive an RAN information request (e.g., from or via OICF 101), and may identify one or more suitable O-RAN elements from which to obtain the received information. Non-Real Time MC 103 may accordingly provide the requested RAN information to OICF 101, which may forward (e.g., via the Noicf SBI) the requested information to the one or more NFs 107 from which the RAN information request was received. The requesting NFs 107 may accordingly modify service parameters associated with one or more services provided by such NFs 107, and/or may propagate the received information to one or more other NFs 107 or other suitable elements. Generally, one or more elements of 5GC (e.g., NFs 107) may adjust configuration parameters, such as QoS parameters, load balancing parameters, resource allocation parameters, etc. based on the received RAN information and/or other information. Such adjusting may preserve end-to-end QoS metrics, improve network efficiency, and/or otherwise leverage the received RAN information in order to improve the operation of 5GC and/or the delivery of end-to-end QoS parameters via the 5GC and the O-RAN.

Figure 2:
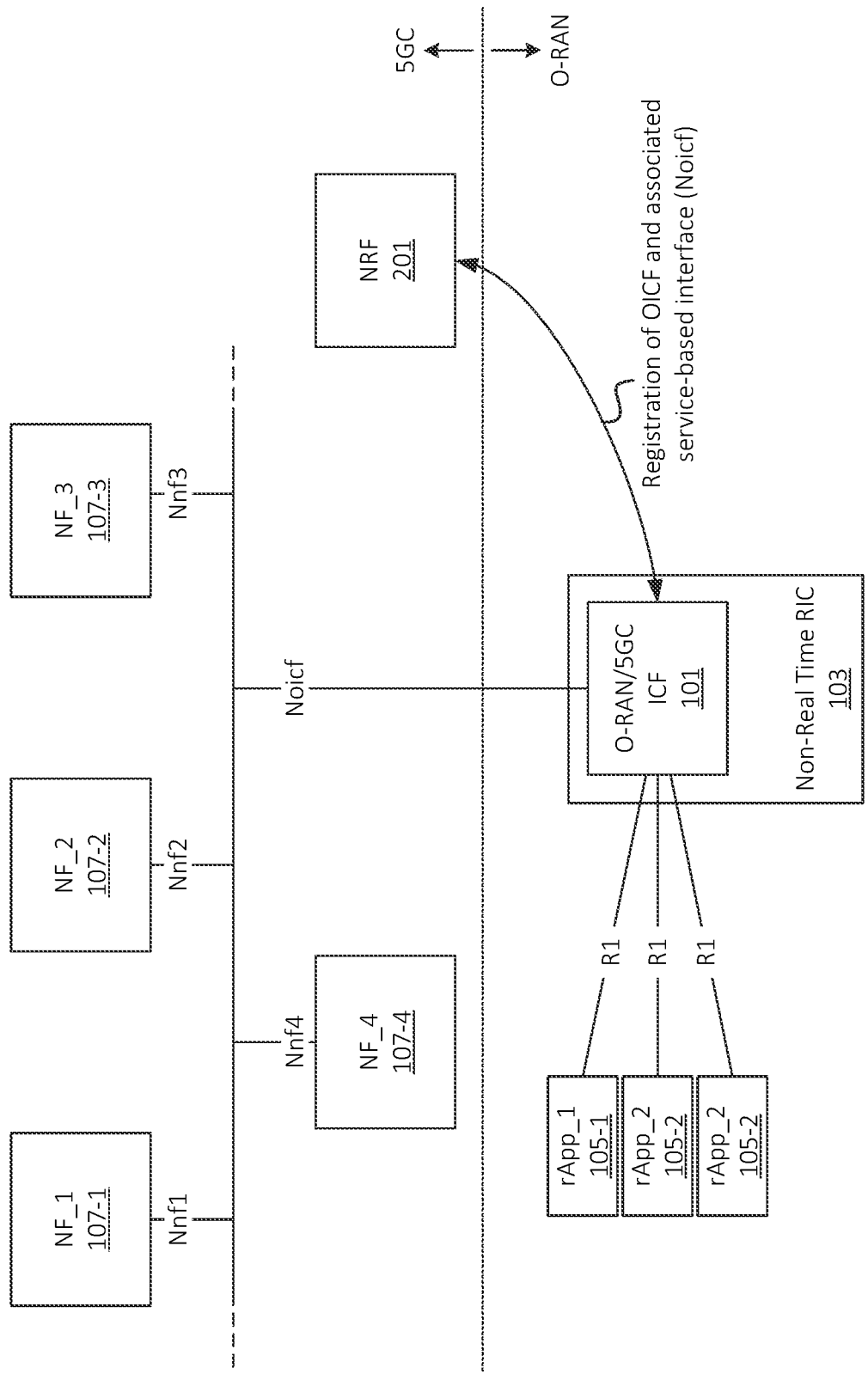
FIG. 2 illustrates an example registration of an intercommunication function with a core network, in accordance with some embodiments.

In order to establish the Noicf interface of the 5GC, OICF 101 may be registered with a function of the 5GC that maintains routing information, mapping information, etc. associating particular NFs 107 with particular SBIs. For example, as shown in FIG. 2, OICF 101 may be registered with Network Repository Function ("NRF") 201 of the 5GC, which may maintain such routing information, mapping information, etc. As part of the registration, NRF 201 may authenticate OICF 101, identify one or more locators (e.g., an Internet Protocol ("IP") address, a Uniform Resource Locator ("URL"), a Uniform Resource Identifier ("URI"), etc.) of OICF 101, associate OICF 101 with a particular SBI (e.g., the Noicf SBI referred to herein), determine or verify types of information that OICF 101 is authorized to request or receive via the Noicf SBI, and/or other suitable registration procedures.

Figure 3:
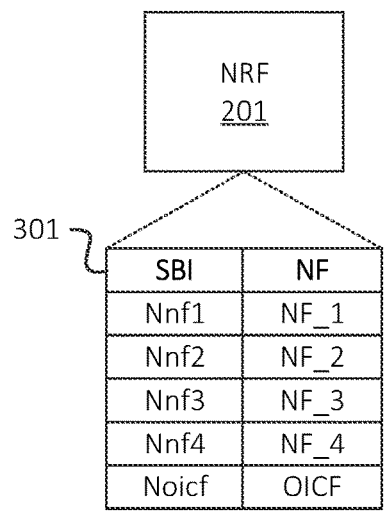
FIG. 3 illustrates an example data structure associating one or more service-based interfaces ("SBI") with one or more network functions of a core network and/or an intercommunication function, in accordance with some embodiments.

For example, as shown in FIG. 3, NRF 201 may maintain data structure 301, which may include information associating particular NFs 107 with particular SBIs. After registration of OICF 101, data structure 301 may include information associating OICF 101 with the Noicf SBI. NRF 301 may additionally maintain routing information or other suitable information (e.g., in data structure 301 and/or in some other suitable data structure) associated with NFs 107 and/or OICF 101. Such information may include, for example, locator information (e.g., IP addresses, URIs, identifiers, etc.) associated with various NFs 107 and/or OICF 101. In some embodiments, such information may include information associated with particular instances of respective NFs 107. For example, a particular NF 107 may be implemented by different instances, which may be geographically distributed or may otherwise have differentiating characteristics. In this manner, NRF 201 may facilitate the routing of communications to appropriate NFs 107 and/or OICF 101 (or instances thereof) based on SBIs specified in such communications.

Figure 4:
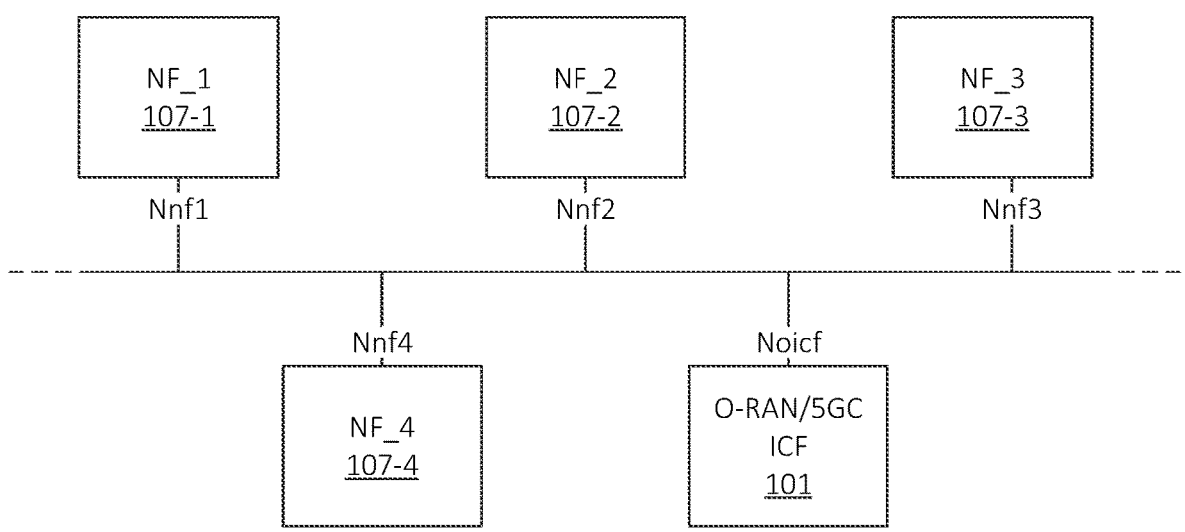
FIG. 4 illustrates an example core network architecture that includes an SBI associated with an intercommunication function, in accordance with some embodiments.

For example, as shown in FIG. 4, once OICF 101 has been registered with NRF 201, OICF 101 may "appear" to be another NF 107 from the perspective of other NFs 107 of the 5GC. For example, NF 107-1, 107-2, etc. may be able to output communications (e.g., core network information requested by one or more elements of the O-RAN, and/or RAN information requests) to OICF 101 by indicating that such communications are associated with the Noicf interface. One or more routing elements may identify or receive (e.g., based on data structure 301 and/or based on suitable information from NRF 201) information associating OICF 101 (e.g., an IP address, URI, etc. of OICF 101) with the Noicf interface, and may accordingly forward such communications to OICF 101.

Additionally, OICF 101 may be able to output communications, such as core network information requests or RAN information (e.g., as requested by one or more NFs 107), to respective NFs 107 via their respective SBIs. For example, OICF 101 may output communications to NF 107-1 by specifying the Nnf1 SBI, may output communications to NF 107-2 by specifying the Nnf2 SBI, etc.

Figure 5:
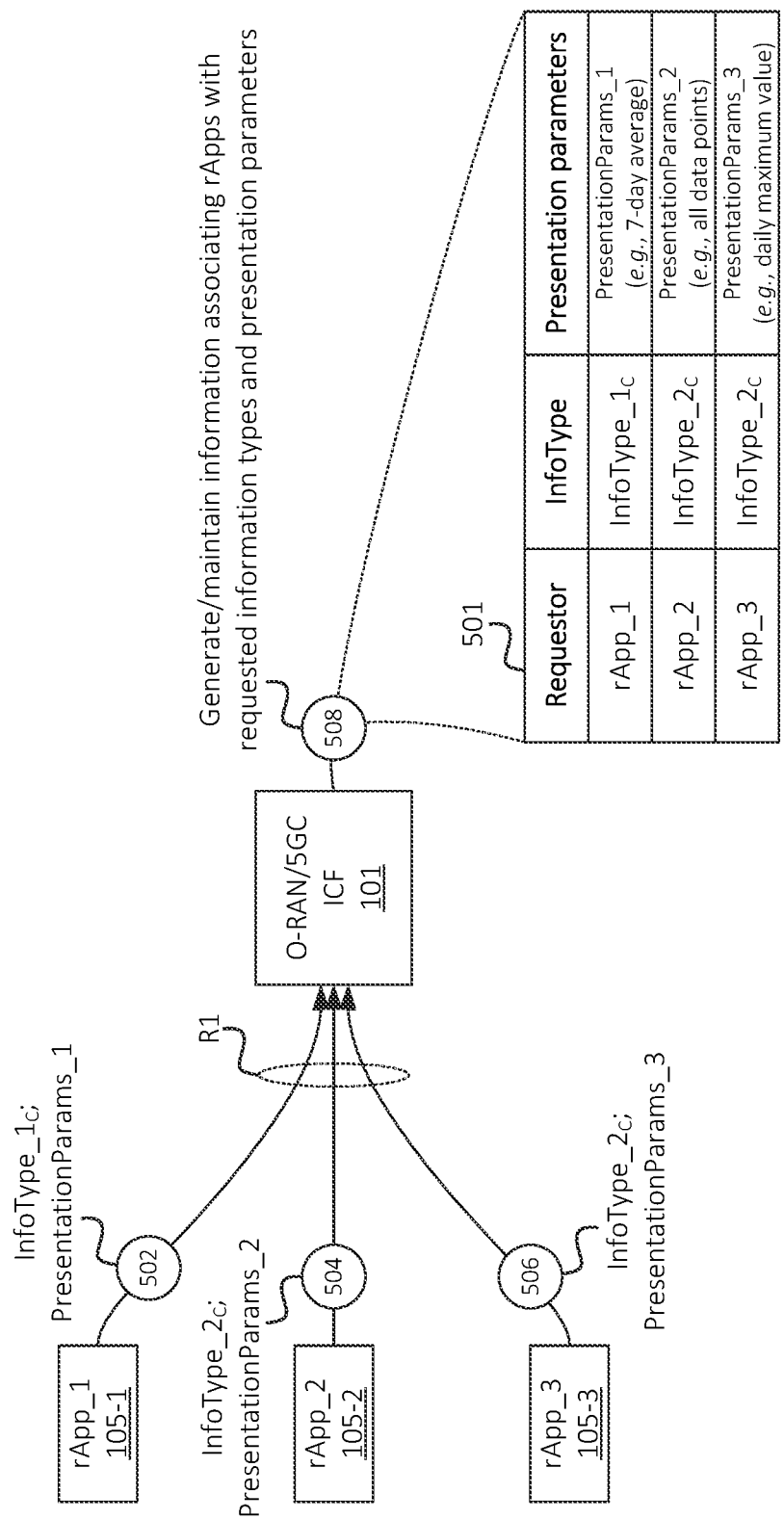
FIGS. 5-8 illustrate an example of a RAN obtaining core network information from a core network, in accordance with some embodiments.

FIGS. 5-8 illustrate an example of one or more O-RAN elements, such as one or more rApps 105, obtaining core network information (e.g., from the 5GC) via OICF 101, in accordance with some embodiments. As shown in FIG. 5, OICF 101 may receive (at 502, 504, and 506) requests for core network information from rApps 105-1, 105-2, and 105-3, respectively. As discussed above, OICF 101 may receive the requests via an R1 interface implemented by OICF 101, and/or from Non-Real Time RIC 103 which may receive the requests via an R1 interface implemented by Non-Real Time MC 103.

The core network information requests may each specify a particular core network information type, such as user data congestion or load metrics, control plane congestion or load metrics, performance information associated with one or more NFs 107 (e.g., latency, throughput, etc.), performance information associated with one or more network slices, analytics information associated with one or more traffic or service types (e.g., voice call services, data services, AGV control services, etc.), and/or other suitable types of information. In some embodiments, the core network information requests may be associated with one or more protocols specified by the R1 interface, and/or in accordance with other suitable protocols or schema. In some embodiments, the core network information requests may include unstructured data, natural language queries, labels, tags, or other suitable information specifying the type of core network information being requested. Different types of core network information, which may be specified in core network information requests (e.g., from rApps 105), are referred to herein as, for example, "InfoType_$1_C$," "InfoType_$2_C$," "InfoType_$3_C$," and so on. For example, as shown in FIG. 2, rApp 105-1 may request InfoType_$1_C$, and rApps 105-2 and 105-3 may both request the same InfoType_$2_C$.

The core network information requests may further, in some embodiments, include presentation parameters, which may specify a manner in which OICF 101 should process, present, format, etc. the requested core network information when providing requested core network information to respective rApps 105. For example, rApp 105-1 may specify a first set of presentation parameters (referred to in the figures as "PresentationParams_1"), rApp 105-2 may specify a second set of presentation parameters (referred to in the figures as "PresentationParams_2"), and rApp 105-3 may specify a third set of presentation parameters (referred to in the figures as "PresentationParams_3"). The first set of presentation parameters may specify, for example, that rApp 105-1 is requesting, on a daily basis, a 7-day average of InfoType_$1_C$. The second set of presentation parameters may specify, as another example, that rApp 105-2 is requesting all data points associated with InfoType_$2_C$ (e.g., as frequently as such data points are received by OICF 101). The third set of presentation parameters may specify, as yet another example, that rApp 105-3 is requesting a daily maximum value of InfoType_$2_C$. Although some examples of presentation parameters have been discussed above, in practice, other types of presentation parameters or processing may be specified, which may refer to computing averages or medians, performing artificial intelligence/machine learning ("AI/ML") processing, performing statistical analyses, and/or performing other suitable operations prior to presenting processed core network information to respective rApps 105.

As further shown, OICF 101 may generate and/or modify (at 508) data structure 501 or some other suitable data structure, maintaining information associating respective rApps 105 with requested information types and presentation parameters. As discussed below, OICF 101 may use such information to route, process, present, etc. received core network information.

Figure 6:
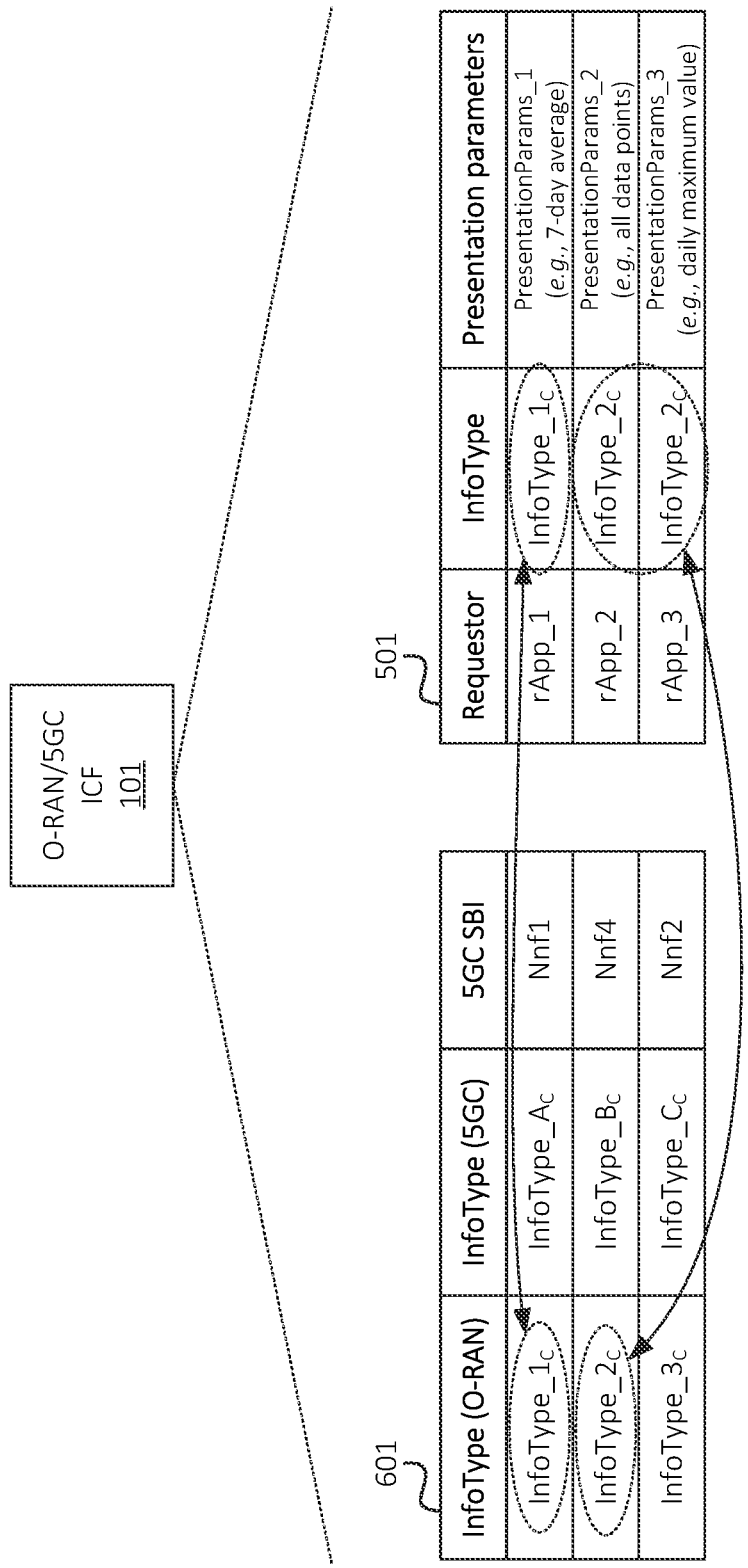
Figure 7:
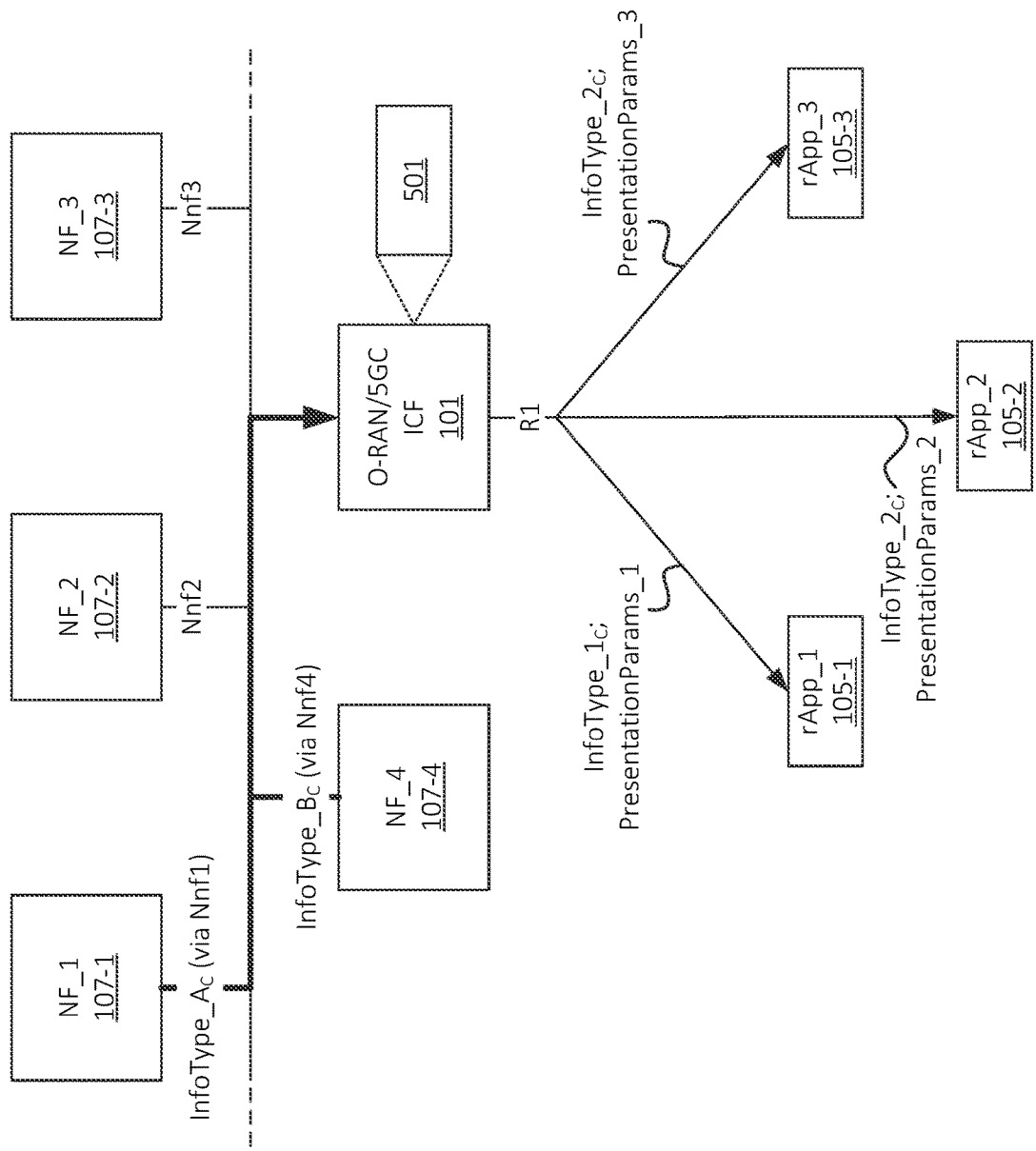

In some embodiments, as shown in FIG. 6, OICF 101 may further maintain data structure 601 or some other suitable data structure, associating information types in accordance with protocols, standards, etc. used by rApps 105 when requesting core network information, to information types in accordance with protocols, standards, etc. used by core network elements when requesting core network information (e.g., which may be used by NFs 107 to request information from other NFs 107). Such information may be used, for example, by OICF 101 to translate, transcode, and/or provide handle core network information requests to 5GC elements based on core network information requests from rApps 105. Data structure 601 may further include information associating a particular SBI, associated with the 5GC, with one or more particular information types (e.g., information types in accordance with protocols used by rApps 105 and/or by NFs 107).

For example, data structure 601 may include information associating the Nnf1 SBI with InfoType_$1_C$ (e.g., an information type in accordance with protocols, standards, natural language queries, labels, etc. included in core network information requests from rApps 105). Additionally, or alternatively, data structure 601 may include information associating InfoType_$1_C$ with a corresponding information type "InfoType_$A_C$" in accordance with protocols, standards, etc. implemented by NFs 107 and/or other elements of the 5GC. In some embodiments, such associations may be manually specified (e.g., by an operator associated with OICF 101). Additionally, or alternatively, such associations may be generated, modified, refined, etc. via AI/ML techniques or other suitable automated techniques.

In this manner, a requestor rApp 105 need not have specific knowledge or awareness of protocols, standards, etc. implemented by the core network from which rApp 105 is requesting information. On the other hand, in some embodiments, core network information requests (e.g., from rApps 105) may include messages, protocols, etc. that are compatible with, native to, etc. the 5GC. In such scenarios, translation or mapping of information types specified in core network information requests (e.g., by rApps 105) may not be necessary.

In this example, OICF 101 may identify that the core network information request from rApp 105-1, for InfoType_$1_C$, is associated with the Nnf1 SBI and/or is associated with the 5GC-compatible InfoType_$A_C$. Similarly, OICF 101 may identify that the core network information requests from rApp 105-2 and 105-3, for InfoType_$2_C$, is associated with the Nnf4 SBI and/or is associated with the 5GC-compatible InfoType_$B_C$.

As shown in FIG. 5, OICF 101 may obtain the requested core network information via the SBIs associated with the requested core network information. For example, OICF 101 may request InfoType_$A_C$ from NF 107-1, which may include periodic and/or intermittent requests for information over time (e.g., on a "pull" basis), and/or may include a request to "subscribe" to InfoType_$A_C$ from NF 107-1. For example, based on the subscription to InfoType_$A_C$, NF 107-1 may "push" the requested InfoType_$A_C$ to OICF 101 (e.g., periodically, intermittently, based on the occurrence of one or more events, or on some other suitable basis) over time. Additionally, or alternatively, OICF 101 may request InfoType_$A_C$ from a management and/or routing platform associated with the 5GC, which may provide the request for InfoType_$A_C$ to NF 107-1 (and/or may specify the Nnf1 SBI in the request for InfoType_$A_C$), as well as indicating that the requested information should be provided to OICF 101 (e.g., via the Noicf SBI). Additionally, OICF 101 may request InfoType_$B_C$ from NF 107-4 (e.g., via the Nnf4 interface), and/or may otherwise suitable indicate (e.g., directly or indirectly, as discussed above) to NF 107-4 that InfoType_$B_C$ should be provided to OICF 101 (e.g., on a "pull" or "push" basis, as discussed above).

When OICF 101 receives the requested core network information (e.g., InfoType_$A_C$ and/or InfoType$B_C$) from NFs 107-1 and 107-2, OICF 101 may identify (e.g., based on information maintained in data structure 501) respective rApps 105 to which the received core network information should be provided. Additionally, OICF 101 may identify particular presentation parameters associated with each respective rApp 105, and may provide the core network information in accordance with such presentation parameters. For example, referring to the examples discussed above, OICF 101 may reformat, translate, etc. InfoType_$A_C$ to another set of protocols, standards, etc. associated with InfoType_$1_C$, and may provide InfoType_$1_C$ to rApp 105-1 in accordance with PresentationParams_1 (e.g., may provide, on a daily basis, a 7-day average of values of InfoType_$A_C$ received from NF 107-1 and/or of values of InfoType_$1_C$ determined based on translating or otherwise processing InfoType_$A_C$).

Further, OICF 101 may present one or more values associated with InfoType_$2_C$ (e.g., based on values of InfoType_$B_C$ received from NF 107-4 via the Noicf SBI) in accordance with PresentationParams_2 to rApp 105-2. Additionally, OICF 101 may present one or more values associated with InfoType_$2_C$ (e.g., based on values of InfoType_$B_C$ received from NF 107-4 via the Noicf SBI) in accordance with PresentationParams_3 to rApp 105-3. Thus, although rApps 105-2 and 105-3 are both requesting information associated with the same InfoType_$2_C$, rApps 105-2 and 105-3 may receive different values and/or at different intervals based on the differing presentation parameters.

Figure 8:
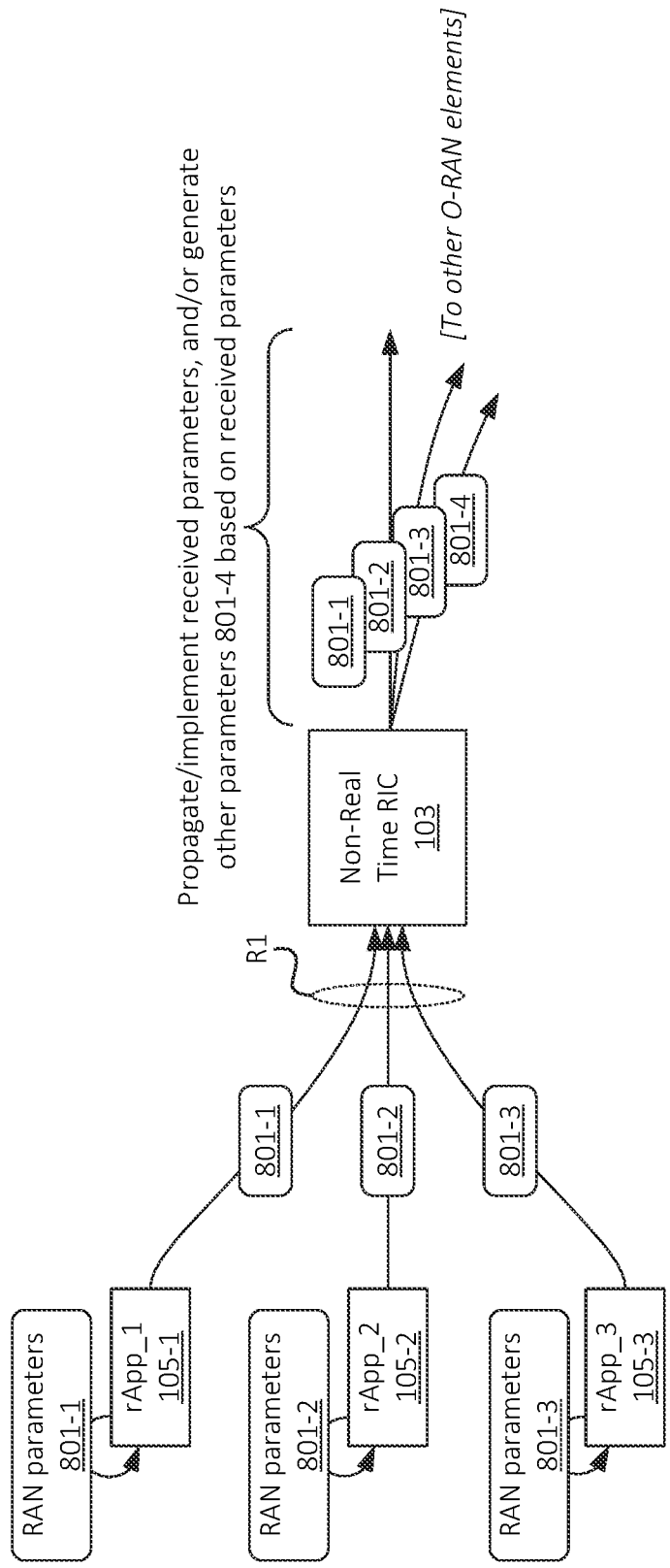

As discussed above, based on receiving the core network information, rApps 105 may generate RAN parameters, processed or aggregated analytic information, recommendations, reports, or other suitable information, based on which parameters of the O-RAN may be modified. As discussed above, such modifications may be performed to account for performance degradations or other attributes or characteristics of the core network. For example, as shown in FIG. 8, rApp 105-1 may generate a first set of RAN parameters, recommendations, reports, alerts, etc. (referred to simply as "RAN parameters" 801-1 for the sake of brevity) based on the received core network information and/or other suitable information. Similarly, rApp 105-2 may generate a second set of RAN parameters 801-2, and rApp 105-3 may generate a third set of RAN parameters 801-3. In some embodiments, rApps 105 may provide RAN parameters 801 to Non-Real Time RIC 103 (e.g., via the R1 interface), which may propagate RAN parameters 801-1, 801-2, and 801-3 to suitable elements of the O-RAN in order to implement RAN parameters 801-1, 801-2, and 801-3. Additionally, or alternatively, Non-Real Time RIC 103 may generate a fourth set of RAN parameters 801-4 based on RAN parameters 801-1, 801-2, 801-3, and/or other suitable information, and may propagate RAN parameters 801-4 to one or more elements of the O-RAN in order to implement RAN parameters 801-4. In this manner, parameters of the O-RAN may be modified to account for, compensate for, etc. core network analytics information, core network event information, and/or other information, in order to facilitate the delivery of end-to-end QoS parameters to traffic that traverses the O-RAN and the core network.

Figure 9:
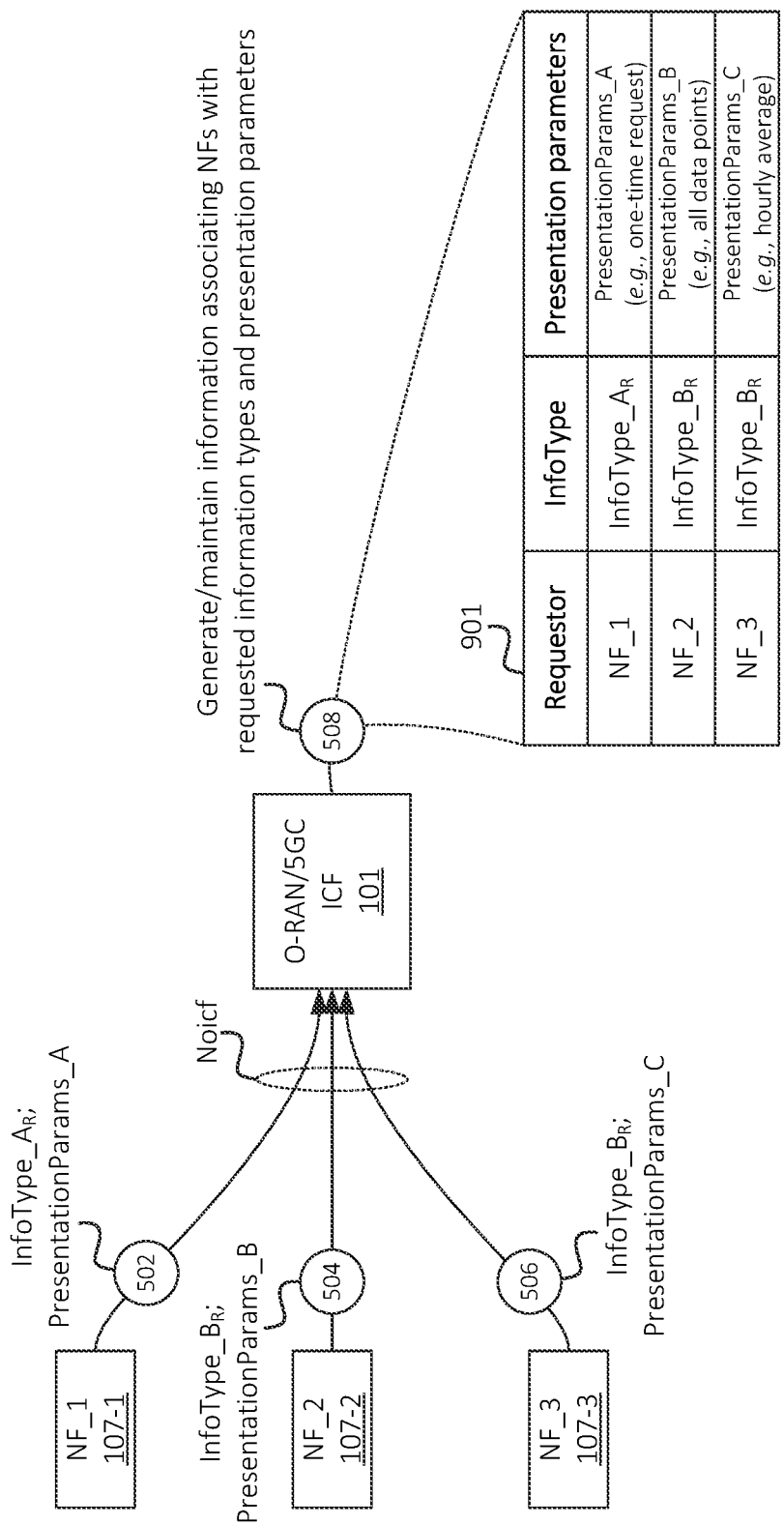
FIGS. 9-11 illustrate an example of a core network obtaining RAN information from a RAN, in accordance with some embodiments.
Figure 10:
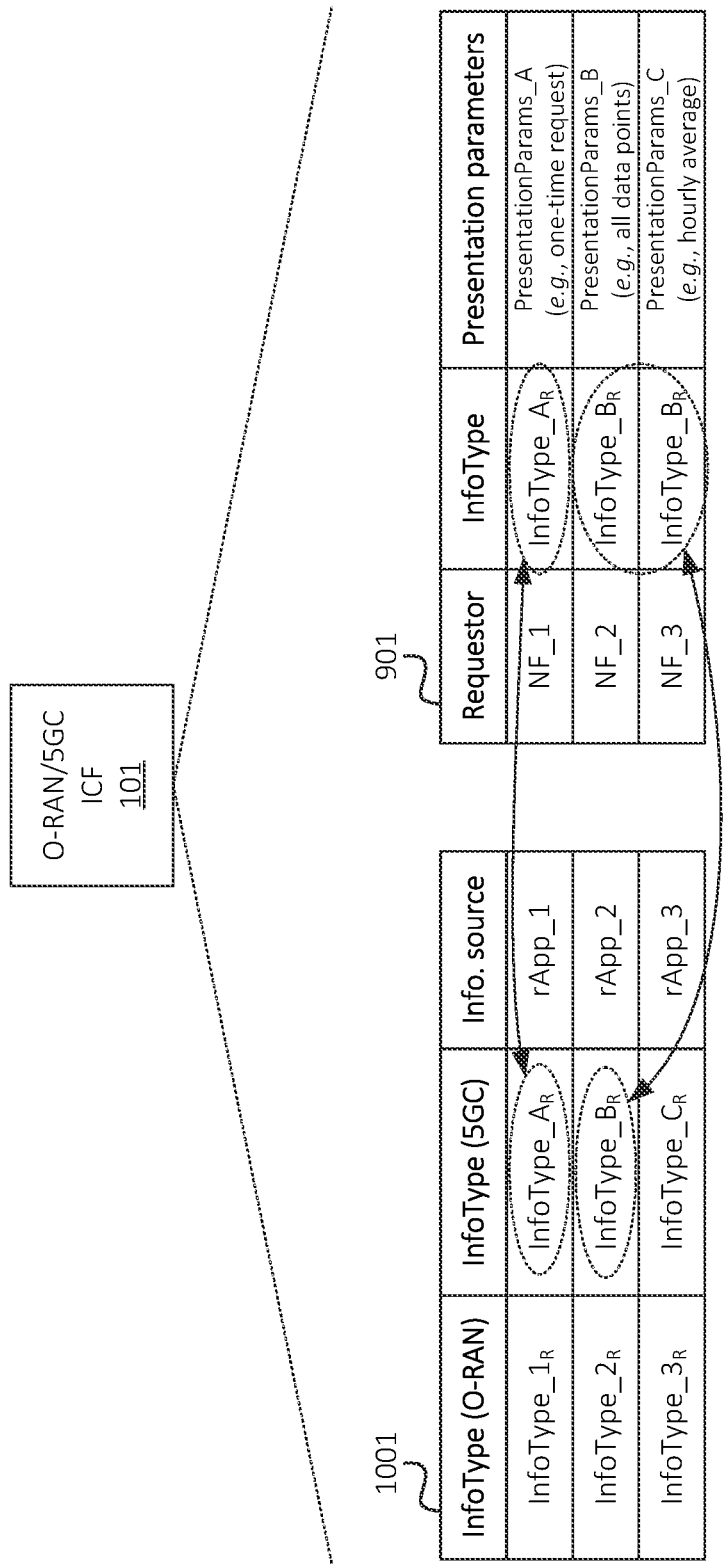
Figure 11:
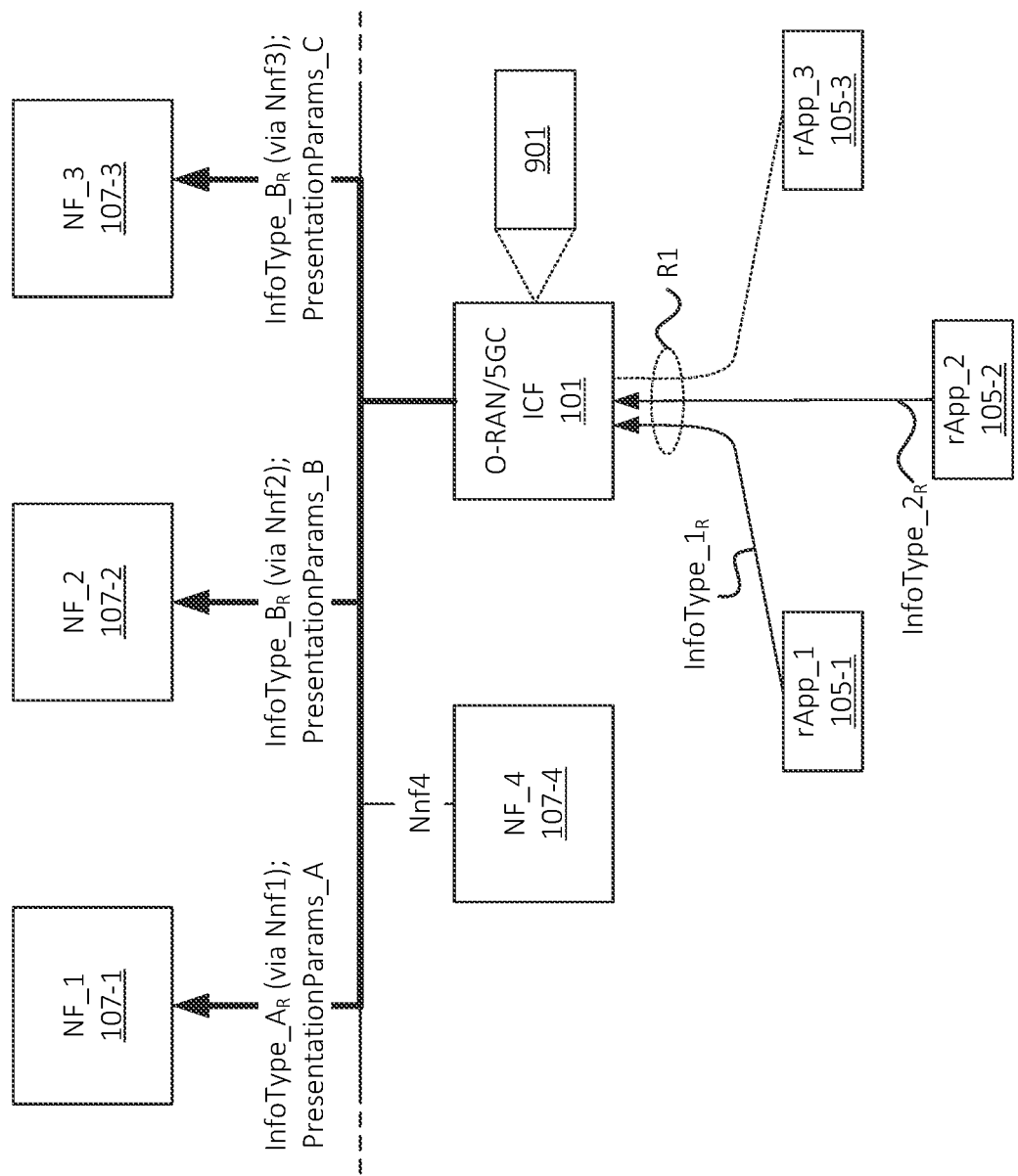

As shown in FIGS. 9-11, OICF 101 may facilitate the providing of RAN information (e.g., RAN analytics information, RAN configuration information, RAN event information, etc.) from elements of the O-RAN to one or more NFs 107 of the 5GC. For example, as shown in FIG. 9, OICF 101 may receive (via the Noicf SBI) a request for RAN information from one or more NFs 107 of the core network. In some embodiments, the requests for RAN information may be in accordance with protocols, standards, etc. associated with the core network, and/or may include natural language queries, tags, labels, etc. Generally, for example, in some embodiments the requests for RAN information may be formatted and/or in accordance with different protocols, standards, etc. than implemented by the RAN (e.g., different from O-RAN protocols, standards, etc.). On the other hand, in some embodiments, the requests for RAN information may be in accordance with, or may include messaging that is in accordance with, protocols or standards implemented by the RAN.

In this example, OICF 101 may receive (at 502) a request for a first type of RAN information (InfoTypeA$_R$) from NF 107-1, and may receive (at 504 and 506) requests for a second type of RAN information (InfoTypeB$_R$) from NFs 107-2 and 107-3, respectively. As similarly discussed above, NFs 107 may also indicate respective presentation parameters, which may indicate a manner in which the requested RAN information should be provided to NFs 107, and/or may specify other processing to perform on the requested RAN information prior to providing the RAN information to NFs 107.

In order to request (at 502, 504, and 506) the RAN information from OICF 101, NFs 107-1, 107-2, and 107-3 may indicate, in the requests, that the requests are directed to the Noicf SBI. Additionally, or alternatively, a routing element receiving the requests may identify that the requested information types are associated with the Noicf SBI and/or should otherwise be routed to OICF 101. Based on receiving (at 502, 504, and 506), the RAN information requests, OICF 101 may generate and/or maintain (at 508) data structure 901 and/or some other suitable data structure, indicating which respective NFs 107 have requested which RAN information types, along with presentation parameters for such requested RAN information.

As similarly discussed above with respect to FIG. 6, OICF 101 may maintain information (e.g., in data structure 1001 or some other suitable data structure) associating information types, in accordance with protocols, standards, etc. that are implemented by or are otherwise compatible with the RAN (e.g., are compatible with the O-RAN), with information types as requested by NFs 107 (e.g., in accordance with protocols, standards, etc. implemented by the core network, and/or otherwise in a format of requests as provided by NFs 107). For example, data structure 1001 may indicate that InfoType_A$_R$, as may be included in RAN information requests from NFs 107, is associated with InfoType_1$_R$, which is in accordance with standards, protocols, etc. implemented by the RAN. As another example, data structure 1001 may indicate that InfoType_B$_R$, as may be included in RAN information requests from NFs 107, is associated with InfoType_2$_R$, which is in accordance with standards, protocols, etc. implemented by the RAN.

Data structure 1001 may also indicate one or more information sources for requested RAN information types. In this example, data structure 1001 indicates that the information source for InfoType_1$_R$ is rApp 105-1, that the information source for InfoType_2$_R$ is rApp 105-2, and that the information source for InfoType_3$_R$ is rApp 105-3. In some embodiments, other elements of the RAN (e.g., O-RAN elements in addition to, or in lieu of, rApps 105) may be information sources for particular types of RAN information.

As shown in FIG. 11, OICF 101 may obtain the requested RAN information (i.e., InfoType_1$_R$ and InfoType_2$_R$, in this example) from the appropriate information sources (e.g., as indicated in data structure 1001). In this example, such information sources are rApps 105-1 and 105-2. In practice, as discussed above, the information sources may include other O-RAN elements in addition to, or in lieu of, rApps 105-1 and 105-2.

OICF 101 may further provide respective requested RAN information to the NFs 107 that requested the RAN information. As similarly discussed above, OICF 101 may translate, encapsulate, reformat, etc. RAN information, as received from OICF 101, in accordance with one or more protocols, standards, etc. implemented by NFs 107. Additionally, or alternatively, OICF 101 may pass through, forward, etc. an unmodified version of the received RAN information. In some embodiments, OICF 101 may perform processing, reformatting, aggregating, and/or other operations in accordance with respective presentation parameters prior to providing RAN information to NFs 107. OICF 101 may utilize information stored in data structure 901 to route RAN information to the appropriate requestor NFs 107 in accordance with presentation parameters specified by each NF 107.

For example, OICF 101 may provide InfoType_A$_R$ (e.g., based on received InfoType_1$_R$) to NF 107-1 via the Nnf1 SBI, in accordance with PresentationParams A. Further, OICF 101 may provide InfoType_B$_R$ (e.g., based on received InfoType_2$_R$) to NF 107-2 via the Nnf2 SBI, in accordance with PresentationParams B. Additionally, OICF 101 may provide InfoType_B$_R$ (e.g., based on received InfoType_2$_R$) to NF 107-3 via the Nnf3 SBI, in accordance with PresentationParams_C. As similarly discussed above, NFs 107-1, 107-2, and 107-3 may modify one or more core network parameters based on the received RAN information (e.g., to account for performance degradations, RAN congestion, and/or other attributes of the RAN as indicated by the received RAN information) and/or based on other information. As another example, NFs 107-1, 107-2, and/or 107-3 may modify parameters of services provided by NFs 107-1, 107-2, and/or 107-3 based on the received RAN information. As yet another example, one or more other NFs 107 of the core network (e.g., NF 107-4) may receive, request, etc. some or all of the received RAN information from NF 107-1, 107-2, and/or 107-3, and may modify parameters associated with NF 107-4 based on the RAN information.

Figure 12:
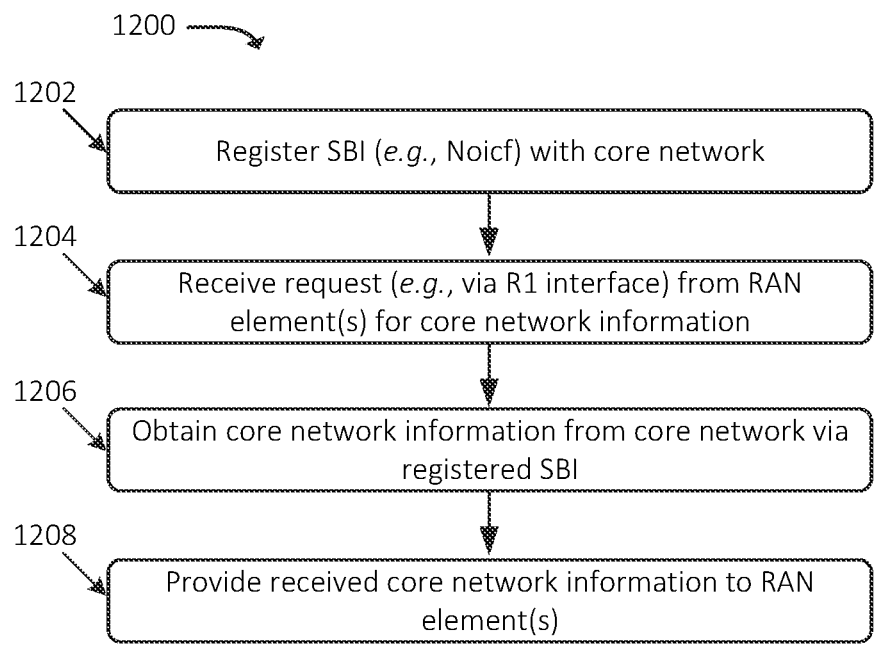
FIG. 12 illustrates an example process for obtaining core network information from a core network, in accordance with some embodiments.

FIG. 12 illustrates an example process 1200 for obtaining (e.g., by a RAN) core network information from a core network. In some embodiments, some or all of process 1200 may be performed by OICF 101. In some embodiments, one or more other devices may perform some or all of process 1200 in concert with, and/or in lieu of, OICF 101, such as Non-Real Time RIC 103.

As shown, process 1200 may include registering (at 1202) an SBI (e.g., the example Noicf SBI or some other suitable SBI) with a core network. As discussed above, the registering (at 1202) may include providing an IP address or other locator information of OICF 101 to NRF 201 and/or some other suitable element of the core network. The core network (e.g., NRF 201 and/or some other element of the core network) may verify that OICF 101 is authorized to send and/or receive communications (e.g., to other NFs 107 of the core network via respective SBIs associated with such NFs 107), and/or may verify particular information types that OICF 101 is authorized to request or provide via the Noicf SBI.

Process 1200 may further include receiving (at 1204) a request for core network information. For example, OICF 101 may receive the request from one or more rApps 105 of the RAN (e.g., via an R1 interface implemented by rApps 105 and/or OICF 101), from Non-Real Time RIC 103 (e.g., via an API or other suitable communication pathway), and/or from some other element of the RAN. The requested core network information may include, for example, core network analytics information, core network event information, core network configuration information, or other suitable types of information that is monitored by, provided by, etc. the core network.

Process 1200 may additionally include obtaining (at 1206) the core network information from the core network via the registered SBI (e.g., the Noicf SBI). For example, as discussed above, OICF 101 may identify one or more particular SBIs (e.g., associated with one or more particular NFs 107) from which the requested core network information may be obtained, and may request the core network information via the identified SBIs. In some embodiments, when requesting the core network information, OICF 101 may indicate or otherwise include the SBI associated with OICF 101 (e.g., the Noicf SBI), such that NFs 107 are able to provide the requested information to OICF 101 via the Noicf SBI.

Process 1200 may also include providing (at 1208) the received core network information to one or more RAN elements. For example, OICF 101 may provide the core network information to one or more rApps 105, Non-Real Time RIC 103, and/or other suitable elements of the RAN. In some embodiments, as discussed above, OICF 101 may reformat, process, and/or perform other operations on (e.g., based on presentation parameters) the received core network information prior to providing the core network information to rApps 105, Non-Real Time RIC 103, and/or other elements of the RAN. As discussed above, rApps 105, Non-Real Time RIC 103, etc. may modify configuration parameters of the RAN, such as beamforming parameters, QoS parameters, and/or other parameters based on the received core network information and/or other information (e.g., RAN analytics information or other RAN information), in order to deliver a threshold level of end-to-end performance and/or enhance overall network efficiency.

Figure 13:
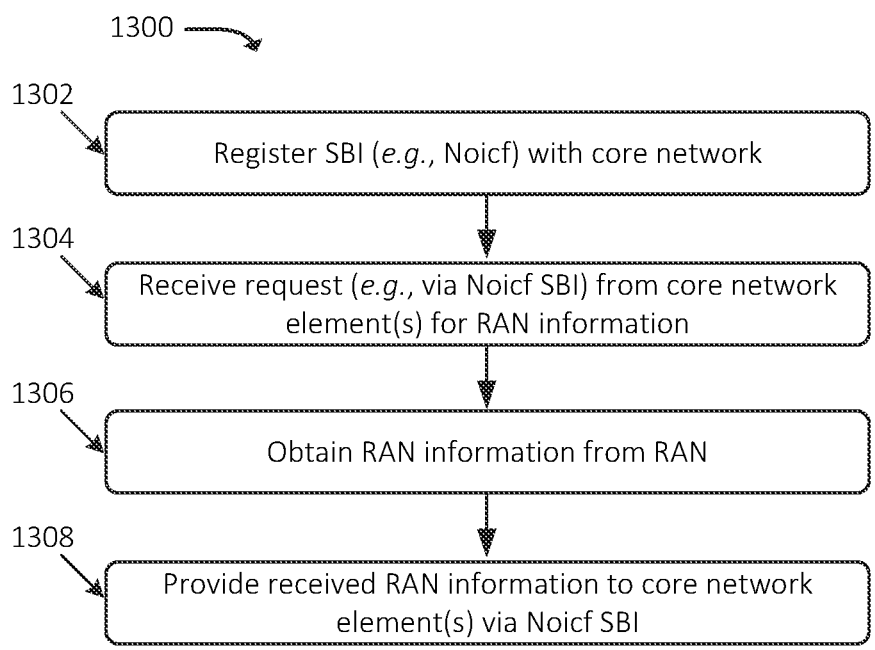
FIG. 13 illustrates an example process for obtaining RAN information from a RAN, in accordance with some embodiments.

FIG. 13 illustrates an example process 1300 for obtaining (e.g., by a core network) RAN information from a RAN (e.g., an O-RAN). In some embodiments, some or all of process 1300 may be performed by OICF 101. In some embodiments, one or more other devices may perform some or all of process 1300 in concert with, and/or in lieu of, OICF 101.

As shown, process 1300 may include registering (at 1302) an SBI (e.g., the example Noicf SBI or some other suitable SBI) with a core network, as similarly discussed above. Process 1300 may further include receiving (at 1304) a request (e.g., via the registered Noicf SBI) for RAN information. For example, one or more NFs 107 or other elements of the core network may utilize the Noicf SBI to request information associated with a RAN to which the core network is communicatively coupled.

Process 1300 may additionally include obtaining (at 1306) the requested RAN information from the RAN. For example, OICF 101 may obtain (e.g., via an R1 interface) the requested RAN information from one or more rApps 105, from Non-Real Time RIC 103, and/or other elements of the RAN.

Process 1300 may also include providing (at 1308) the received RAN information to the core network via the Noicf SBI. For example, OICF 101 may provide the received RAN information to the particular NFs 107 that requested the RAN information, and/or to one or more other NFs 107 specified in the request. In some embodiments, the core network may allow OICF 101 to provide the information based on information maintained in NRF 201, indicating that OICF 101 is authorized to communicate with one or more other NFs 107, that OICF 101 is authorized to output particular information types (e.g., information types pertaining to RAN information), and/or other based on other suitable authorization information maintained by NRF 201 or some other element of the core network. As discussed above, the core network may modify parameters of services provided via the core network and/or the RAN based on the received information, which may include accounting for performance metrics, service degradations, congestion, etc. which may be indicated by the received RAN information.

Figure 14:
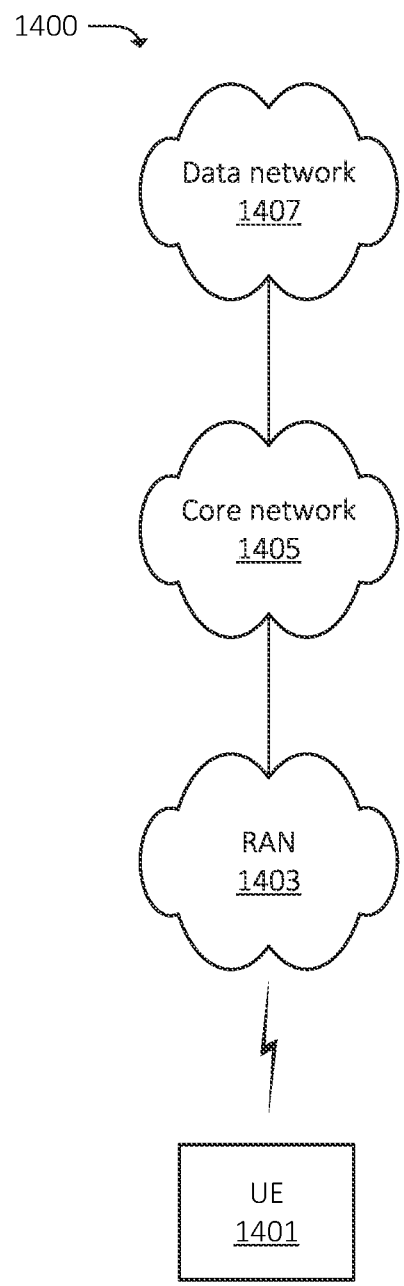
FIG. 14 illustrates an example environment in which one or more embodiments, described herein, may be implemented.

FIG. 14 illustrates an example environment 1400, in which one or more embodiments may be implemented. In some embodiments, environment 1400 may correspond to a 5G network, and/or may include elements of a 5G network. As shown, environment 1400 may include UE 1401, RAN 1403 (which may include one or more Next Generation Node Bs ("gNBs") and/or evolved Node Bs ("eNBs")), and core network 1405. In some embodiments, environment 1400 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an EPC).

In some embodiments, RAN 1403 may be, may include, and/or may implement an O-RAN. In some embodiments, core network 1405 may be, may include, and/or may implement a 5GC and/or some other type of core network that utilizes SBIs or other types of routing mechanisms by which different elements may be associated with different interfaces, identifiers, etc. used to route communications to such elements. In some embodiments, core network 1405 may include various NFs 107, such as an AMF, a Serving Gateway ("SGW"), an SMF, a PCF, an Application Function ("AF"), a UPF, a UDM, an Authentication Server Function ("AUSF"), a DCCF, an NWDAF, and/or other types of NFs 107. As discussed above, core network 1405 may also include NRF 201 and/or some other suitable element that maintains information associating particular NFs 107 with particular SBIs. Environment 1400 may also include one or more networks, such as Data Network ("DN") 1407.

The quantity of devices and/or networks, illustrated in FIG. 14, is provided for explanatory purposes only. In practice, environment 1400 may include additional devices and/or networks, fewer devices and/or networks, different devices and/or networks, or differently arranged devices and/or networks than illustrated in FIG. 14. For example, environment 1400 may include devices that facilitate or enable communication between various components shown in environment 1400, such as routers, modems, gateways, switches, hubs, etc. Elements of environment 1400 may interconnect with each other and/or other elements via wired connections, wireless connections, or a combination of wired and wireless connections. In some implementations, one or more elements of environment 1400 may be physically integrated in, and/or may be physically attached to, one or more other elements of environment 1400.

UE 1401 may include a computation and communication device, such as a wireless mobile communication device that is capable of communicating with RAN 1403, RAN 1412, and/or DN 1407. UE 1401 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, IoT device (e.g., a sensor, a smart home appliance, a wearable device, a Machine-to-Machine ("M2M") device, or the like), an AGV, or another type of mobile computation and communication device. UE 1401 may send traffic (e.g., user plane traffic) to and/or receive traffic from DN 1407 via RAN 1403 and core network 1405 (e.g., via a UPF of core network 1405).

RAN 1403 may be, or may include, a 5G RAN, an LTE RAN, and/or some other type of RAN that includes one or more base stations (e.g., one or more gNBs, eNBs, and/or other types of base stations), via which UE 1401 may communicate with one or more other elements of environment 1400. UE 1401 may communicate with RAN 1403 via an air interface (e.g., as provided by a gNB, an eNB, etc.). For instance, RAN 1403 may receive traffic (e.g., user plane traffic such as voice call traffic, data traffic, messaging traffic, etc.) from UE 1401 via the air interface, and may communicate the traffic to core network 1405 (e.g., a UPF of core network 1405). Further, RAN 1403 may receive signaling traffic, control plane traffic, etc. from UE 1401 via the air interface, and may communicate such signaling traffic, control plane traffic, etc. to an AMF associated with core network 1405. Additionally, RAN 1403 may receive traffic intended for UE 1401 (e.g., from a UPF, an AMF, and/or one or more other devices or networks) and may communicate the traffic to UE 1401 via the air interface.

As noted above, core network 1405 may include one or more particular types of NFs 107, such as an AMF. The AMF may include one or more devices, systems, Virtualized Network Functions ("VNFs"), Cloud-Native Network Functions ("CNFs"), etc., that perform operations to register UE 1401 with the RAN 1403 and/or core network 1405, to establish bearer channels associated with a session with UE 1401, to facilitate handovers or other mobility events associated with UE 1401, and/or to perform other suitable operations. The AMF may, in some embodiments, be associated with an Namf SBI or other suitable SBI.

In some embodiments, one or more NFs 107 may include an SMF, which may include one or more devices, systems, VNFs, CNFs, etc., that gather, process, store, and/or provide information in a manner described herein. The SMF may, for example, facilitate the establishment of communication sessions on behalf of UE 1401. In some embodiments, the establishment of communications sessions may be performed in accordance with one or more policies provided by a PCF of core network 1405. The SMF may, in some embodiments, be associated with an Nsmf SBI or other suitable SBI.

The PCF of core network 1405 may include one or more devices, systems, VNFs, CNFs, etc., that aggregate and/or provide policy information. For example, the PCF may receive information regarding policies and/or subscriptions from one or more sources, such as subscriber databases and/or from one or more users (such as, for example, an administrator associated with the PCF and/or core network 1405), and may provide such information to one or more other NFs 107 of core network 1405. The PCF may, in some embodiments, be associated with an Npcf SBI or other suitable SBI.

An AF associated with, and/or communicatively coupled to, core network 1405 may include one or more devices, systems, VNFs, CNFs, etc., that receive, store, and/or provide information that may be used in determining parameters (e.g., quality of service parameters, charging parameters, or the like) for certain applications. The AF may, in some embodiments, provide services to UE 1401 via core network 1405 and/or RAN 1403. The AF may, in some embodiments, be associated with an Naf SBI or other suitable SBI.

A UPF of core network 1405 (e.g., as implemented by one or more NFs 107) may include one or more devices, systems, VNFs, CNFs, etc., that receive, store, and/or provide data (e.g., user plane data). For example, the UPF may receive user plane data (e.g., voice call traffic, data traffic, etc.), destined for UE 1401, from DN 1407, and may forward the user plane data toward UE 1401 (e.g., via RAN 1403, an SMF, and/or one or more other devices or networks). Similarly, the UPF may receive traffic from UE 1401 (e.g., via RAN 1403, the SMF, and/or one or more other devices or networks), and may forward the traffic toward DN 1407. In some embodiments, the UPF may communicate with the SMF regarding user plane data processed by the UPF. The UPF may, in some embodiments, be associated with an Nupf SBI or other suitable SBI.

A UDM and/or AUSF of core network 1405 may include one or more devices, systems, VNFs, CNFs, etc., that manage, update, and/or store, in one or more memory devices or cloud-based storage systems, profile information associated with one or more subscribers or UEs 1401. The AUSF and/or UDM may perform authentication, authorization, and/or accounting operations associated with the subscriber and/or a communication session with UE 1401. The UDM may, in some embodiments, be associated with an Nudm SBI or other suitable SBI. The AUSF may, in some embodiments, be associated with an Nausf SBI or other suitable SBI.

DN 1407 may include one or more wired and/or wireless networks. For example, DN 1407 may include an IP-based Packet Data Network ("PDN"), a wide area network ("WAN") such as the Internet, a private enterprise network, and/or one or more other networks. UE 1401 may communicate, through DN 1407, with data servers, other UEs 1401, and/or to other servers or applications that are coupled to DN 1407. DN 1407 may be connected to one or more other networks, such as a public switched telephone network ("PSTN"), a public land mobile network ("PLMN"), and/or another network. DN 1407 may be connected to one or more devices, such as content providers, applications, web servers, and/or other devices, with which UE 1401 may communicate.

Figure 15:
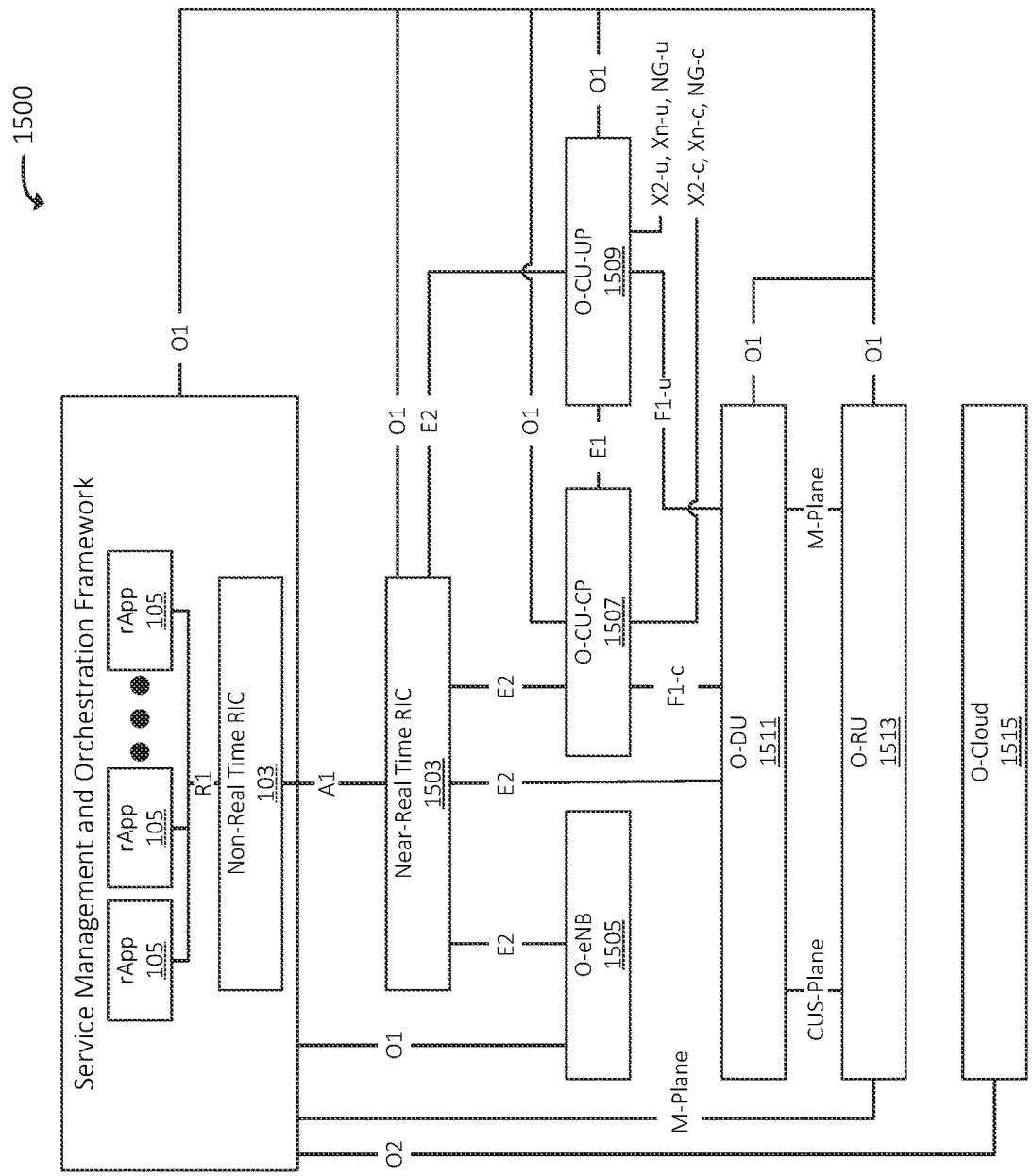
FIG. 15 illustrates an example arrangement of an Open RAN ("O-RAN") environment in which one or more embodiments, described herein, may be implemented.

FIG. 15 illustrates an example O-RAN environment 1500, which may correspond to RAN 1403. For example, RAN 1403 may include one or more instances of O-RAN environment 1500, and/or one or more instances of O-RAN environment 1500 may implement RAN 1403 and/or some portion thereof. As shown, O-RAN environment 1500 may include Non-Real Time MC 103, one or more rApps 105, Near-Real Time RIC 1503, O-eNB 1505, O-Central Unit-Control Plane ("O-CU-CP") 1507, O-CU-User Plane ("O-CU-UP") 1509, O-Distributed Unit ("O-DU") 1511, O-Radio Unit ("RU") 1513, and O-Cloud 1515. In some embodiments, O-RAN environment 1500 may include additional, fewer, different, and/or differently arranged components.

In some embodiments, some or all of the elements of O-RAN environment 1500 may be implemented by one or more configurable or provisionable resources, such as virtual machines, cloud computing systems, physical servers, and/or other types of configurable or provisionable resources. In some embodiments, some or all of O-RAN environment 1500 may be implemented by, and/or communicatively coupled to, one or more MECs $r07.

Non-Real Time RIC 103 and Near-Real Time RIC 1503 may receive performance information (and/or other types of information) from one or more sources, and may configure other elements of O-RAN environment 1500 based on such performance or other information. For example, Near-Real Time RIC 1503 may receive performance information, via one or more E2 interfaces, from O-eNB 1505, O-CU-CP 1507, and/or O-CU-UP 1509, and may modify parameters associated with O-eNB 1505, O-CU-CP 1507, and/or O-CU-UP 1509 based on such performance information. Similarly, Non-Real Time RIC 103 may receive performance information associated with O-eNB 1505, O-CU-CP 1507, O-CU-UP 1509, and/or one or more other elements of O-RAN environment 1500 and may utilize machine learning and/or other higher level computing or processing to determine modifications to the configuration of O-eNB 1505, O-CU-CP 1507, O-CU-UP 1509, and/or other elements of O-RAN environment 1500. As another example, as discussed above, Non-Real Time MC 103 may receive configuration parameters, recommendations, alerts, aggregated analytics and/or event information, etc. from one or more rApps 105, and may determine modifications to the configuration of O-eNB 1505, O-CU-CP 1507, O-CU-UP 1509, and/or other elements of O-RAN environment 1500 based on information received from rApps 105. Additionally, or alternatively, as discussed above, Non-Real Time RIC 103 may receive core network information (e.g., from one or more elements of core network 1405, in accordance with embodiments discussed above), and may determine modifications to the configuration of O-eNB 1505, O-CU-CP 1507, O-CU-UP 1509, and/or other elements of O-RAN environment 1500 based on core network information received from core network 1405. In some embodiments, Non-Real Time RIC 103 may generate machine learning models based on performance information associated with O-RAN environment 1500 or other sources, and may provide such models to Near-Real Time RIC 1503 for implementation.

O-eNB 1505 may facilitate wireless communications between UE 1401 and a core network. O-CU-CP 1507 may perform control plane signaling to coordinate the aggregation and/or distribution of traffic via one or more DUs $r03, which may include and/or be implemented by one or more O-DUs 1511, and O-CU-UP 1509 may perform the aggregation and/or distribution of traffic via such DUs $r03 (e.g., O-DUs 1511). O-DU 1511 may be communicatively coupled to one or more RUs $r01, which may include and/or may be implemented by one or more 0-RUs 1513. In some embodiments, O-Cloud 1515 may include or be implemented by one or more Multi-Access/Mobile Edge Computing ("MEC") devices, referred to sometimes herein simply as "MECs," which may provide services, and may be communicatively coupled, to O-CU-CP 1507, O-CU-UP 1509, O-DU 1511, and/or O-RU 1513 (e.g., via an O1 and/or O2 interface).

Figure 16:
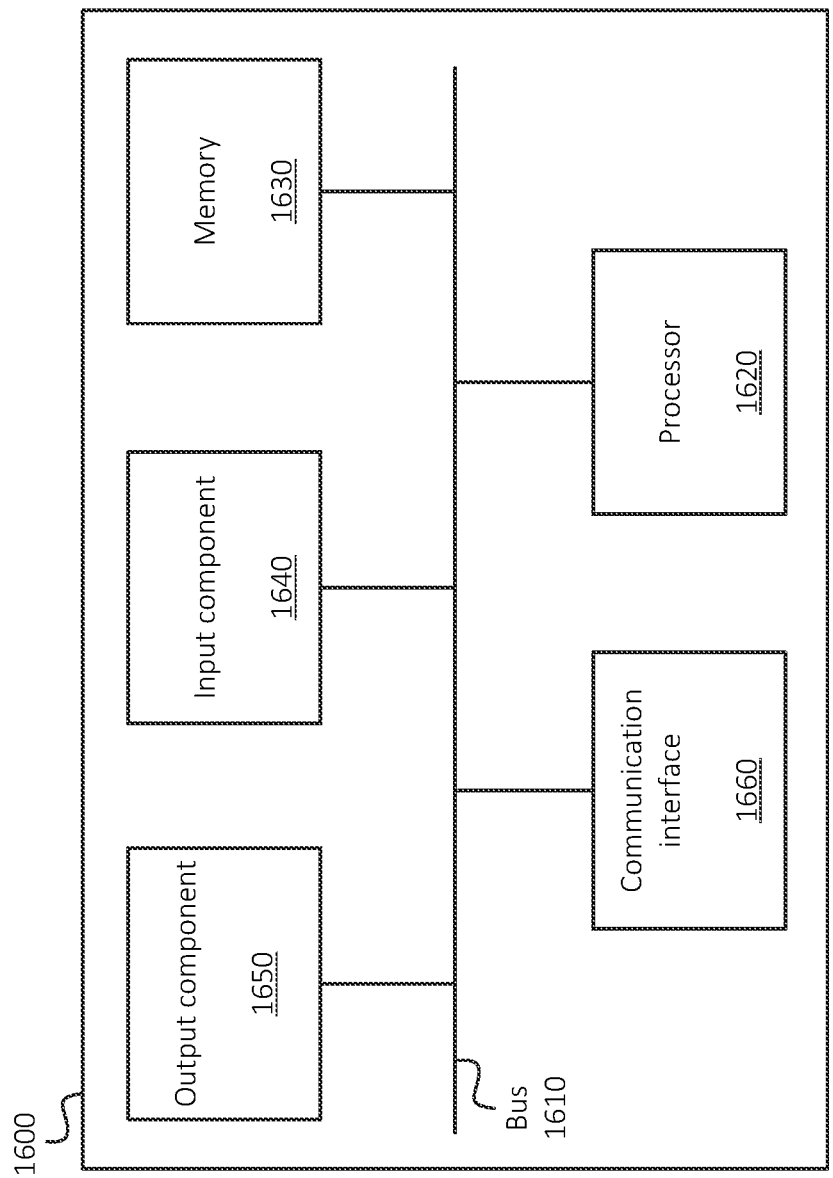
FIG. 16 illustrates example components of one or more devices, in accordance with one or more embodiments described herein.

FIG. 16 illustrates example components of device 1600. One or more of the devices described above may include one or more devices 1600. Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions. In some embodiments, processor 1620 may be or may include one or more hardware processors. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600 and/or other receives or detects input from a source external to 1640, such as a touchpad, a touchscreen, a keyboard, a keypad, a button, a switch, a microphone or other audio input component, etc. In some embodiments, input component 1640 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1650 may include a mechanism that outputs information to the operator, such as a display, a speaker, one or more light emitting diodes ("LEDs"), etc.

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing software instructions stored in a computer-readable medium, such as memory 1630. A computer-readable medium may be defined as a non-transitory memory device. A memory device may include space within a single physical memory device or spread across multiple physical memory devices. The software instructions may be read into memory 1630 from another computer-readable medium or from another device. The software instructions stored in memory 1630 may cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-13), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
register a particular Service-Based Interface ("SBI") with a core network, wherein the core network maintains information associating the device with the particular SBI;
receive, via an R1 interface in an Open Radio Access Network ("O-RAN") environment, a first request for core network information associated with the core network;
identify a particular set of Network Functions ("NFs"), of the core network, from which the core network information is available;
request the core network information, associated with the core network, from the particular set of NFs of the core network,
wherein requesting the core network information includes indicating the particular SBI to the particular set of NFs of the core network,
wherein the particular set of NFs of the core network provide the requested core network information to the device via the registered particular SBI based on the particular SBI being indicated in the request; and
provide, via the R1 interface and to one or more elements of the O-RAN environment, the core network information received via the particular SBI, wherein the one or more elements of the O-RAN environment modify one or more configuration parameters of the O-RAN environment based on the provided core network information.

2. The device of claim 1, wherein the core network includes a Network Repository Function ("NRF") that maintains the information associating the device with the particular SBI.

3. The device of claim 1, wherein the particular set of NFs include at least one of:
a Data Collection Coordination Function ("DCCF"),
a Network Data Analytics Function ("NWDAF"), or
an Access and Mobility Management Function ("AMF").

4. The device of claim 1, wherein the requested core network information includes at least one of:
core network analytics information,
core network event information, or
core network configuration information.

5. The device of claim 1, wherein the particular SBI is a first SBI, wherein the one or more processors are further configured to:
receive, via the first SBI and from a particular NF of the core network, a request for radio access network ("RAN") information;
request the RAN information from one or more elements of the O-RAN environment; and
provide the requested RAN information to the particular NF of the core network via a second SBI that is associated with the particular NF.

6. A non-transitory computer-readable medium, storing a plurality of processor-executable instructions to:
register a particular Service-Based Interface ("SBI") with a core network, wherein the core network maintains information associating a particular device with the particular SBI;
receive, via an R1 interface in an Open Radio Access Network ("O-RAN") environment, a first request for core network information associated with the core network;
identify a particular set of Network Functions ("NFs"), of the core network, from which the core network information is available;
request the core network information, associated with the core network, from the particular set of NFs of the core network,
wherein requesting the core network information includes indicating the particular SBI to the particular set of NFs of the core network,
wherein the particular set of NFs of the core network provide the requested core network information to the particular device via the registered particular SBI based on the particular SBI being indicated in the request; and
provide, via the R1 interface and to one or more elements of the O-RAN environment, the core network information received via the particular SBI, wherein the one or more elements of the O-RAN environment modify one or more configuration parameters of the O-RAN environment based on the provided core network information.

7. The non-transitory computer-readable medium of claim 6, wherein the core network includes a Network Repository Function ("NRF") that maintains the information associating the particular device with the particular SBI.

8. The non-transitory computer-readable medium of claim 6, wherein the particular set of NFs include at least one of:
a Data Collection Coordination Function ("DCCF"),
a Network Data Analytics Function ("NWDAF"), or
an Access and Mobility Management Function ("AMF").

9. The non-transitory computer-readable medium of claim 6, wherein the requested core network information includes at least one of:
core network analytics information,
core network event information, or
core network configuration information.

10. The non-transitory computer-readable medium of claim 6, wherein the particular SBI is a first SBI, wherein the plurality of processor-executable instructions further include processor-executable instructions to:
receive, via the first SBI and from a particular NF of the core network, a request for radio access network ("RAN") information;
request the RAN information from one or more elements of the O-RAN environment; and
provide the requested RAN information to the particular NF of the core network via a second SBI that is associated with the particular NF.

11. A method, comprising:
registering a particular Service-Based Interface ("SBI") with a core network, wherein the core network maintains information associating a particular device with the particular SBI;
receiving, via an R1 interface in an Open Radio Access Network ("O-RAN") environment, a first request for core network information associated with the core network;
identifying a particular set of Network Functions ("NFs"), of the core network, from which the core network information is available;
requesting the core network information, associated with the core network, from the particular set of NFs of the core network,
wherein requesting the core network information includes indicating the particular SBI to the particular set of NFs of the core network,
wherein the particular set of NFs of the core network provide the requested core network information to the particular device via the registered particular SBI based on the particular SBI being indicated in the request; and
providing, via the R1 interface and to one or more elements of the O-RAN environment, the core network information received via the particular SBI, wherein the one or more elements of the O-RAN environment modify one or more configuration parameters of the O-RAN environment based on the provided core network information.

12. The method of claim 11, wherein the core network includes a Network Repository Function ("NRF") that maintains the information associating the particular device with the particular SBI.

13. The method of claim 11, wherein the particular set of elements of the core network include at least one of:
a Data Collection Coordination Function ("DCCF"),
a Network Data Analytics Function ("NWDAF"), or
an Access and Mobility Management Function ("AMF").

14. The method of claim 11, wherein the requested core network information includes at least one of:
core network analytics information,
core network event information, or
core network configuration information.

15. The method of claim 11, wherein the particular SBI is a first SBI, the method further comprising:
receiving, via the first SBI and from a particular NF of the core network, a request for radio access network ("RAN") information;
requesting the RAN information from one or more elements of the O-RAN environment; and
providing the requested RAN information to the particular NF of the core network via a second SBI that is associated with the particular NF.

16. The method of claim 11, wherein the one or more elements of the O-RAN environment implement one or more RAN automation applications ("rApps").

17. The method of claim 11, wherein the particular device includes a Radio Intelligent Controller ("RIC") of the O-RAN environment.

18. The device of claim 1, wherein the one or more elements of the O-RAN environment implement one or more RAN automation applications ("rApps").

19. The device of claim 1, wherein the device includes a Radio Intelligent Controller ("RIC") of the O-RAN environment.

20. The non-transitory computer-readable medium of claim 6, wherein the one or more elements of the O-RAN environment implement one or more RAN automation applications ("rApps").

21. The non-transitory computer-readable medium of claim 6, wherein the particular device includes a Radio Intelligent Controller ("RIC") of the O-RAN environment.

* * * * *